United States Patent
Kobayashi

(10) Patent No.: US 10,171,190 B2
(45) Date of Patent: Jan. 1, 2019

(54) DEVICE AND METHOD FOR TESTING MIMO SCHEME SYSTEM

(71) Applicant: ANRITSU CORPORATION, Kanagawa (JP)

(72) Inventor: Takeshi Kobayashi, Kanagawa (JP)

(73) Assignee: ANRITSU CORPORATION, Kanagawa (JP)

(*) Notice: Subject to any disclaimer, the term of this patent is extended or adjusted under 35 U.S.C. 154(b) by 0 days.

(21) Appl. No.: 15/810,833

(22) Filed: Nov. 13, 2017

(65) Prior Publication Data

US 2018/0175950 A1 Jun. 21, 2018

(30) Foreign Application Priority Data

Dec. 19, 2016 (JP) ................. 2016-245604

(51) Int. Cl.
| | | |
|---|---|---|
| H04B 7/06 | (2006.01) | |
| H04B 17/10 | (2015.01) | |
| H04B 17/391 | (2015.01) | |
| H04B 7/0413 | (2017.01) | |

(52) U.S. Cl.
CPC ....... H04B 17/3911 (2015.01); H04B 7/0617 (2013.01); H04B 17/102 (2015.01); H04B 7/0413 (2013.01)

(58) Field of Classification Search
CPC ..... H04L 12/64; H04L 12/6418; H04L 12/66; H04W 40/26; H04B 17/3911; H04B 17/102; H04B 7/0617; H04B 7/0413
See application file for complete search history.

(56) References Cited

U.S. PATENT DOCUMENTS

| | | | | |
|---|---|---|---|---|
| 8,175,111 | B2* | 5/2012 | Sung | H04L 12/2838 370/252 |
| 8,457,231 | B2* | 6/2013 | Zhu | H04L 27/2601 375/260 |
| 9,143,290 | B2* | 9/2015 | Lovell | H04L 5/0046 |
| 9,647,731 | B2* | 5/2017 | Ardalan | H04B 7/043 |
| 10,020,861 | B2* | 7/2018 | Moshfeghi | H04W 84/00 |
| 2014/0126618 | A1 | 5/2014 | Kobayashi et al. | |

* cited by examiner

*Primary Examiner* — Sharad Rampuria
(74) *Attorney, Agent, or Firm* — Pearne & Gordon LLP

(57) ABSTRACT

A window function arithmetic operation unit performs a convolution arithmetic operation of the frequency characteristics of a window function with the input of modulation signals which are output by a layer frequency domain signal generation unit. A beam forming equivalence arithmetic operation unit performs an arithmetic operation process equivalent to the beam forming process with the input of propagation channel characteristics of each path which are output by a fading setting unit, and a Fourier transform unit performs Fourier transform with the input of the arithmetic operation results. An arithmetic operation unit obtains spectrum information of signals to be received in receiving antennas, converts the obtained spectrum information into signals in the time domain through inverse Fourier transform processes performed by a time domain signal generation unit. A shift addition unit shifts and adds the converted signals, to generate received signals of the receiving antennas.

6 Claims, 9 Drawing Sheets

DEVICE AND METHOD FOR TESTING MIMO SCHEME SYSTEM

TECHNICAL FIELD

The present invention relates to a technique for reducing the circuit scale of a testing device having a function of performing a fading process with respect to a propagation channel of N×M channels assumed between transmitting and receiving antennas, using a terminal compatible with a multi input multi output (MIMO) scheme for transmitting a downlink signal from a base station to a mobile terminal with the number of base station-side antennas N and the number of terminal-side antennas M, or a circuit substrate, an integrated circuit and the like built into the terminal, as a test object.

BACKGROUND ART

As shown in FIG. 9, in a MIMO scheme, downlink signals Stx1 to StxN to the terminal side are transmitted from N (N=4 in this example) base station-side antennas (hereinafter, referred to as transmitting antennas) Atx1 to AtxN, and are received in M (M=2 in this example) terminal-side antennas (hereinafter, referred to as receiving antennas) Arx1 to ArxM.

Therefore, N×M propagation channels (channels) are assumed between each transmitting antenna and each receiving antenna, and U (for example, U=4) paths different from each other for each channel are assumed. In a case where the propagation characteristics of each channel inclusive of a path are set to H (1, 1, 1 to U) to H (N, M, 1 to U), and a mobile terminal supporting the MIMO scheme, a circuit used in the mobile terminal, or the like is tested, it is necessary to perform an arithmetic operation process in which the effects of propagation characteristics of each channel and the characteristics of a loss, a delay, a Doppler shift or the like for a path are taken into account with respect to a downlink signal, to finally generate received signals Srx1 to SrxM which are output from M receiving antennas Arx1 to ArxM, and to give the generated signals to a test object 1.

On the other hand, in recent years, as a modulation scheme, high-speed signal transmission based on a multi-carrier modulation scheme such as orthogonal frequency division multiplexing (OFDM), universal filtered multicarrier (UFMC), generalized frequency division multiplexing (GFDM), or filtered bank multi-carrier (FBMC) is realized, and a MIMO scheme system capable of higher-speed information communication is realized by a combination of this multicarrier modulation scheme and the MIMO scheme, whereby a device for testing the system is required.

In addition, in the next-generation (fifth generation) communication scheme, it is proposed to use a higher frequency band. In a case where a frequency band used in communication in this manner becomes higher, the size of each antenna can be formed to be small. Therefore, so-called beam forming becomes possible in which an array antenna structure having a large number of antenna elements arranged lengthwise and breadthwise is adopted, and radio waves are efficiently radiated in a direction in which a mobile terminal of a communication object is present, by phase control of a downlink signal given to these antenna elements. Therefore, in a testing device in which such a next-generation mobile terminal is a test object, an arithmetic operation process of beam forming for a large number of antennas arrayed is required.

FIG. 10 shows a configuration example of a testing device for testing a system in which a multicarrier modulation scheme, a MIMO scheme and a beam forming process based on an array antenna are combined.

This testing device 10 is a device supporting OFDM for performing communication with a terminal using K subcarriers as one of the multicarrier modulation schemes, and a layer frequency domain signal generation unit 11 generates and outputs modulation signals (constellation data) $S_{sym}(1, 1)$ to $S_{sym}(1, K)$, $S_{sym}(2, 1)$ to $S_{sym}(2, K)$, ..., $S_{sym}(R, 1)$ to $S_{sym}(R, K)$ for each of K subcarriers with respect to R series of transmission data (called layer or stream) to be transmitted to a test object. This modulation signal $S_{sym}$ is a signal in a frequency domain including R series of data having K constellation data lined up on a frequency axis, for each OFDM symbol.

These modulation signals $S_{sym}$ are input to a beam forming processing unit 12, are arithmetically processed so that the beam characteristics of radio waves emitted from N transmitting antennas are set to desired characteristics, and are converted into beam forming process signals Sbf(1, 1) to Sbf(1, K), Sbf(2, 1) to Sbf(2, K), ..., Sbf(N, 1) to Sbf(N, K) for each of K subcarriers per transmitting antenna. Meanwhile, in the following description inclusive of the drawing, a set of j signals Sx(i, 1) to Sx(i, j) may be abbreviated to Sx(i, 1 to j).

These beam forming process signals Sbf are input to N sets of time domain signal generation units 13(1) to 13(N). Each time domain signal generation unit 13(i) (i=1 to N) performs an inverse Fourier transform (IFFT) process, a cyclic prefix (CP) addition process, a band-limiting process, or the like with respect to a set of K beam forming process signals Sbf (i, 1 to K), and converts the signals into signals on a time axis specified in an OFDM scheme.

Thereby, transmission signals (downlink signals) Stx1 to StxN given to N transmitting antennas Atx1 to AtxN are output from the respective time domain signal generation units 13(1) to 13(N).

These transmission signals Stx1 to StxN are input to a propagation channel simulator 20 that simulates the characteristics of the propagation channel of N×M channels.

The propagation channel simulator 20 takes N×M channels formed between N transmitting antennas and M receiving antennas and U paths for each of the channels into consideration, adds a desired delay and fading to these N×M×U paths, and virtually generates signals received by the M receiving antennas.

This propagation channel simulator 20 is used in giving Rayleigh fading indicating the distribution of reception level fluctuations in wireless communication, and includes a delay setting unit 21 that gives a predetermined delay to U paths which are set in N series of transmission signals Stx1 to StxN to be output, a fading setting unit 22 that obtains the characteristics of a propagation channel of Rayleigh distribution to which a Doppler shift and MIMO-correlated information are given, and an arithmetic operation unit 23 that generates signals Srx1 to SrxM received in the M receiving antennas through N×M×U virtual propagation channels by a product-sum arithmetic operation (matrix multiplication) using all paths' delay processing signals Stx (1, 1, 1 to U), Stx (2, 1, 1 to U), ..., Stx (N, M, 1 to U) which are output from the delay setting unit 21 and propagation characteristics H (1, 1, 1 to U), H (2, 1, 1 to U), ..., H (N, M, 1 to U) obtained by the fading setting unit 22.

Here, the delay setting unit 21 gives a desired delay to each path by, for example, a combination of a delay of one sample unit based on a memory and a delay of one sample or less based on a resampling filter.

In addition, the arithmetic operation process of the arithmetic operation unit 23 is, for example, as follows.

$$Srx1 = \Sigma H(1,1,i) \cdot Stx(1,1,i) + \Sigma H(2,1,i) \cdot Stx(2,1,i) + \ldots$$

$$+ \Sigma H(N,1,i) \cdot Stx(N,1,i)$$

$$Srx2 = \Sigma H(1,2,i) \cdot Stx(1,2,i) + \Sigma H(2,2,i) \cdot Stx(2,2,i) + \ldots$$

$$+ \Sigma H(N,2,i) \cdot Stx(N,2,i) \ldots$$

$$SrxM = \Sigma H(1,M,i) \cdot Stx(1,M,i) + \Sigma H(2,M,i) \cdot Stx(2,M,i) + \ldots$$

$$+ \Sigma H(N,M,i) \cdot Stx(N,M,i)$$

Here, the symbol $\Sigma$ indicates the sum of i=1 to U.

The received signals Srx1 to SrxM obtained in this manner are given to the test object 1, and thus it is possible to test the operation of the test object 1 for a propagation channel between the transmitting and receiving antennas which is set on the testing device side.

Meanwhile, a device for testing a system in which a propagation channel simulator is not included, but the multicarrier modulation scheme and the MIMO scheme are combined as described above is disclosed in, for example, the following Patent Document 1.

RELATED ART DOCUMENT

Patent Document

[Patent Document 1] US 2014/0126618 A1

DISCLOSURE OF THE INVENTION

Problem that the Invention is to Solve

As in the testing device having the above configuration, the number of arrayed transmitting antennas N becomes as very large as, for example, 128 in a system that performs a beam forming process. Accordingly, 128 sets of time domain signal generation units 13 that perform N series of inverse Fourier transform processes in parallel are required, and thus the scale of a circuit becomes very large.

In addition, as described above, the delay setting unit 21 of the propagation channel simulator 20 requires a hardware configuration for giving an arbitrary delay by a combination of a memory and a resampling filter. Therefore, in order to give an arbitrary delay to U paths which are set in 128 series of signals as described above, the scale of a circuit also becomes very large, and the size of a device increases, which leads to an increase in manufacturing cost and power consumption.

The present invention is contrived to solve the above problem, and an object thereof is to provide a testing device and a testing method which are capable of being realized on a small circuit scale and at low power consumption even in a case where the number of transmitting antennas is large in a system in which a multicarrier modulation scheme, a MIMO scheme and a beam forming process are combined.

Means for Solving the Problem

In order to achieve the object, according to claim 1 of the present invention, there is provided a device for testing a MIMO scheme system adopting a multicarrier modulation scheme using K carriers in communication with one mobile terminal, a MIMO scheme having the number of transmitting antennas N and the number of receiving antennas M, and a beam forming process scheme for setting radiation beam characteristics based on transmitting antennas having the number of antennas N, in which N×M channels and a pseudo-propagation channel having U paths in each of the channels are assumed between the transmitting antennas and the receiving antennas, and signals received by the M receiving antennas through the propagation channel are generated to be given to a test object, the device including:

a layer frequency domain signal generation unit (31) that generates R×K series of modulation signals in a frequency domain for each of the K carriers with the input of R layers' worth of data signal sequences to be transmitted to the test object;

a window function arithmetic operation unit (32) that performs a convolution arithmetic operation of frequency characteristics of a window function in a time domain with the input of the R×K series of modulation signals, output by the layer frequency domain signal generation unit, as a process equivalent to signal excision based on multiplication of the window function in the time domain;

a fading setting unit (51) that obtains propagation channel characteristics of all paths assumed between the transmitting antennas and the receiving antennas;

a beam forming equivalence arithmetic operation unit (52) that performs an arithmetic operation process equivalent to the beam forming process for setting the radiation beam characteristics based on the transmitting antennas having the number of antennas N to desired characteristics, with the input of the N×M×U paths' worth of propagation channel characteristics obtained in the fading setting unit;

a Fourier transform unit (53) that performs Fourier transform taking account of a delay for each path with the input of the propagation channel characteristics of all paths obtained by the beam forming equivalence arithmetic operation unit, and obtains propagation channel characteristics in the frequency domain;

an arithmetic operation unit (54) that obtains spectrum information of a signal to be received in each of the receiving antennas by multiplications of the propagation channel characteristics in the frequency domain obtained by the Fourier transform unit and arithmetic operation results of the window function arithmetic operation unit;

a time domain signal generation unit (33) that performs inverse Fourier transform processes with the input of the arithmetic operation results of the arithmetic operation unit, and generates signals in the time domain to be received by the receiving antennas; and a shift addition unit (34) that shifts and adds the signals in the time domain generated by the time domain signal generation unit by a length of the window function in the time domain, and generates consecutive signals to be received by the receiving antennas.

In addition, according to claim 2 of the present invention, there is provided a device for testing a MIMO scheme system adopting a multicarrier modulation scheme using K carriers in communication with one mobile terminal, a MIMO scheme having the number of transmitting antennas N and the number of receiving antennas M, and a beam forming process scheme for setting radiation beam characteristics based on transmitting antennas having the number of antennas N, in which N×M channels and a pseudo-propagation channel having U paths in each of the channels are assumed between the transmitting antennas and the receiving antennas, and signals received by the M receiving antennas through the propagation channel are generated to be given to a test object, the device including:

a layer frequency domain signal generation unit (31) that generates R×K series of modulation signals in a frequency domain for each of the K carriers with the input of R layers' worth of data signal sequences to be transmitted to the test object;

a window function arithmetic operation unit (32) that performs a convolution arithmetic operation of frequency characteristics of a window function in a time domain with the input of the R×K series of modulation signals, output by the layer frequency domain signal generation unit, as a process equivalent to signal excision based on multiplication of the window function in the time domain;

a fading setting unit (51) that obtains propagation channel characteristics of all paths assumed between the transmitting antennas and the receiving antennas;

a Fourier transform unit (53') that performs Fourier transform taking account of a delay for each path with the input of the propagation channel characteristics of all paths obtained in the fading setting unit, and obtains propagation channel characteristics in the frequency domain;

a beam forming equivalence arithmetic operation unit (52') that performs an arithmetic operation process equivalent to the beam forming process for setting the radiation beam characteristics based on the transmitting antennas having the number of antennas N to desired characteristics, with the input of the propagation channel characteristics in the frequency domain obtained in the Fourier transform unit;

an arithmetic operation unit (54') that obtains spectrum information of a signal to be received in each of the receiving antennas by multiplications of the arithmetic operation result of the beam forming equivalence arithmetic operation unit and the arithmetic operation results of the window function arithmetic operation unit;

a time domain signal generation unit (33) that performs inverse Fourier transform processes with the input of the arithmetic operation results of the arithmetic operation unit, and generates signals in the time domain to be received by the receiving antennas; and a shift addition unit (34) that shifts and adds the signals in the time domain generated by the time domain signal generation unit by a length of the window function in the time domain, and generates consecutive signals to be received by the receiving antennas.

In addition, according to claim 3 of the present invention, there is provided a device for testing a MIMO scheme system adopting a multicarrier modulation scheme using K carriers in communication with one mobile terminal, a MIMO scheme having the number of transmitting antennas N and the number of receiving antennas M, and a beam forming process scheme for setting radiation beam characteristics based on transmitting antennas having the number of antennas N, in which N×M channels and a pseudo-propagation channel having U paths in each of the channels are assumed between the transmitting antennas and the receiving antennas, and signals received by the M receiving antennas through the propagation channel are generated to be given to a test object, the device including:

a layer frequency domain signal generation unit (31) that generates R×K series of modulation signals in a frequency domain for each of the K carriers with the input of R layers' worth of data signal sequences to be transmitted to the test object;

a window function arithmetic operation unit (32) that performs a convolution arithmetic operation of frequency characteristics of a window function in a time domain with the input of the R×K series of modulation signals, output by the layer frequency domain signal generation unit, as a process equivalent to signal excision based on multiplication of the window function in the time domain;

a beam forming equivalence arithmetic operation unit (52") that performs an arithmetic operation process equivalent to the beam forming process for setting the radiation beam characteristics based on the transmitting antennas having the number of antennas N to desired characteristics, with the input of arithmetic operation results of the window function arithmetic operation unit;

a fading setting unit (51) that obtains propagation channel characteristics of all paths assumed between the transmitting antennas and the receiving antennas;

a Fourier transform unit (53') that performs Fourier transform taking account of a delay for each path with the input of the propagation channel characteristics of all paths obtained in the fading setting unit, and obtains propagation channel characteristics in the frequency domain;

an arithmetic operation unit (54") that obtains spectrum information of a signal to be received in each of the receiving antennas by multiplications of the propagation channel characteristics in the frequency domain obtained by the Fourier transform unit and the arithmetic operation results of the beam forming equivalence arithmetic operation unit;

a time domain signal generation unit (33) that performs inverse Fourier transform processes with the input of the arithmetic operation results of the arithmetic operation unit, and generates signals in the time domain to be received by the receiving antennas; and a shift addition unit (34) that shifts and adds the signals in the time domain generated by the time domain signal generation unit by a length of the window function in the time domain, and generates consecutive signals to be received by the receiving antennas.

In addition, according to claim 4 of the present invention, there is provided a method for testing a MIMO scheme system adopting a multicarrier modulation scheme using K carriers in communication with one mobile terminal, a MIMO scheme having the number of transmitting antennas N and the number of receiving antennas M, and a beam forming process scheme for setting radiation beam characteristics based on transmitting antennas having the number of antennas N, in which N×M channels and a pseudo-propagation channel having U paths in each of the channels are assumed between the transmitting antennas and the receiving antennas, and signals received by the M receiving antennas through the propagation channel are generated to be given to a test object, the method including:

a step of generating R×K series of modulation signals in a frequency domain for each of the K carriers with the input of R layers' worth of data signal sequences to be transmitted to the test object;

a step of performing a convolution arithmetic operation of frequency characteristics of a window function in a time domain with the input of the R×N series of modulation signals, as a process equivalent to signal excision based on multiplication of the window function in the time domain;

a step of obtaining propagation channel characteristics of all paths assumed between the transmitting antennas and the receiving antennas;

a step of performing an arithmetic operation process equivalent to the beam forming process for setting the radiation beam characteristics based on the transmitting antennas having the number of antennas N to desired characteristics, with the input of the propagation channel characteristics obtained for all paths;

a step of performing Fourier transform taking account of a delay for each path with the input of the propagation channel characteristics of all paths obtained in the arithmetic operation process equivalent to the beam forming process, and obtaining propagation channel characteristics in the frequency domain;

a step of obtaining spectrum information of a signal to be received in each of the receiving antennas by multiplications of the propagation channel characteristics in the frequency domain and results of the convolution arithmetic operation of frequency characteristics of a window function;

a step of performing inverse Fourier transform processes with the input of the spectrum information, and generating signals in the time domain to be received by the receiving antennas; and a step of shifting and adding the generated signal in the time domain by a length of the window function in the time domain, and generating consecutive signals to be received by the receiving antennas.

In addition, according to claim 5 of the present invention, there is provided a method for testing a MIMO scheme system adopting a multicarrier modulation scheme using K carriers in communication with one mobile terminal, a MIMO scheme having the number of transmitting antennas N and the number of receiving antennas M, and a beam forming process scheme for setting radiation beam characteristics based on transmitting antennas having the number of antennas N, in which N×M channels and a pseudo-propagation channel having U paths in each of the channels are assumed between the transmitting antennas and the receiving antennas, and signals received by the M receiving antennas through the propagation channel are generated to be given to a test object, the method including:

a step of generating R×K series of modulation signals in a frequency domain for each of the K carriers with the input of R layers' worth of data signal sequences to be transmitted to the test object;

a step of performing a convolution arithmetic operation of frequency characteristics of a window function in a time domain with the input of the R×N series of modulation signals, as a process equivalent to signal excision based on multiplication of the window function in the time domain;

a step of obtaining propagation channel characteristics of all paths assumed between the transmitting antennas and the receiving antennas;

a step of performing Fourier transform taking account of a delay for each path with the input of the propagation channel characteristics obtained for all paths, and obtaining propagation channel characteristics in the frequency domain;

a step of performing an arithmetic operation process equivalent to the beam forming process for setting the radiation beam characteristics based on the transmitting antennas having the number of antennas N to desired characteristics, with the input of the propagation channel characteristics obtained by the Fourier transform;

a step of obtaining spectrum information of a signal to be received in each of the receiving antennas by multiplications of the propagation channel characteristics obtained in the arithmetic operation process equivalent to the beam forming process and results of the convolution arithmetic operation of frequency characteristics of the window function;

a step of performing inverse Fourier transform processes with the input of the spectrum information, and generating signals in the time domain to be received by the receiving antennas; and a step of shifting and adding the generated signals in the time domain by a length of the window function in the time domain, and generating consecutive signals to be received by the receiving antennas.

In addition, according to claim 6 of the present invention, there is provided a method for testing a MIMO scheme system adopting a multicarrier modulation scheme using K carriers in communication with one mobile terminal, a MIMO scheme having the number of transmitting antennas N and the number of receiving antennas M, and a beam forming process scheme for setting radiation beam characteristics based on transmitting antennas having the number of antennas N, in which N×M channels and a pseudo-propagation channel having U paths in each of the channels are assumed between the transmitting antennas and the receiving antennas, and signals received by the M receiving antennas through the propagation channel are generated to be given to a test object, the method including:

a step of generating R×K series of modulation signals in a frequency domain for each of the K carriers with the input of R layers' worth of data signal sequences to be transmitted to the test object;

a step of performing a convolution arithmetic operation of frequency characteristics of a window function in a time domain with the input of the R×N series of modulation signals, as a process equivalent to signal excision based on multiplication of the window function in the time domain;

a step of performing an arithmetic operation process equivalent to the beam forming process for setting the radiation beam characteristics based on the transmitting antennas having the number of antennas N to desired characteristics, with the input of arithmetic operation results of the convolution arithmetic operation of the window function;

a step of obtaining propagation channel characteristics of all paths assumed between the transmitting antennas and the receiving antennas;

a step of performing Fourier transform taking account of a delay for each path with the input of the propagation channel characteristics of all paths, and obtaining propagation channel characteristics in the frequency domain;

a step of obtaining spectrum information of a signal to be received in each of the receiving antennas by multiplications of the propagation channel characteristics in the frequency domain and arithmetic operation results of the arithmetic operation process equivalent to the beam forming process;

a step of performing inverse Fourier transform processes with the input of the spectrum information, and generating signals in the time domain to be received by the receiving antennas; and a step of shifting and adding the generated signals in the time domain by a length of the window function in the time domain, and generating consecutive signals to be received by the receiving antennas.

Advantage of the Invention

In this manner, in the example of the present invention, a modulation signal for each carrier is generated with the input of a data signal sequence of R layers, a convolution arithmetic operation of the frequency characteristics of a window function is performed on this modulation signal as a process in the frequency domain equivalent to signal excision based on the multiplication of the window function in the time domain, an arithmetic operation process equivalent to a beam forming process of determining radiation beam characteristics based on a plurality of transmitting antennas is performed on propagation channel characteristics of all paths, Fourier transform for which a delay for each path is taken account of is performed on the result, propagation channel characteristics in the frequency domain to which beam forming is performed is obtained, information (spectrum information) in the frequency domain of a signal received in each receiving antenna is obtained by the multiplications of the propagation channel characteristics in the frequency domain and the results of the convolution arithmetic operation of the frequency characteristics of the window function, a signal in the time domain is generated by performing inverse Fourier transform processes on the obtained information, and the generated signal is shifted and added by the length of the window function, to thereby generate consecutive received signals to be received in each receiving antenna.

In this manner, in the example of the present invention, the multiplication arithmetic operation of the characteristics of the propagation channel and the modulation signal is performed in the frequency domain, and a time domain signal is generated from the arithmetic operation result. Therefore, it is possible to considerably reduce the scale of a circuit that performs inverse Fourier transform and the scale of a circuit that generates propagation channel characteristics, as compared with a case where inverse Fourier transform is applied to a signal in the frequency domain for each transmitting antenna to convert the signal into a signal in the time domain and then the propagation channel characteristics is given, as in a scheme of related art.

For example, in a case of R=2, N=128, M=8, and the number of carriers K, inverse Fourier transform is required to be applied to a set of K signals in parallel by 128 (=N) sets in order to generate a time domain signal in a scheme of related art, but, in the example of the present invention, inverse Fourier transform may be applied to a set of K signals in parallel by 8 (=M) sets at a minimum, and the scale of a circuit can be reduced to M/N.

However, in the example of the present invention, a Fourier transform process for converting the propagation channel characteristics of all paths into the frequency domain is required, but in this Fourier transform process, the amount of delay of each path in the time domain corresponds to the rotational speed of a frequency component of each path in the frequency domain. Therefore, hardware in which a delay is given to each path by a combination of a memory and a resampling filter performed in the time domain of related art is replaced by a rotation process in Fourier transform, and the example of the present embodiment is considerably advantageous when both the scales of hardware are compared with each other.

Furthermore, since the arithmetic operation process of the beam forming equivalence arithmetic operation unit is performed on the output of the fading setting unit, and Fourier transform is performed on the result, whereby the Fourier transform process may be performed by R×M×U series, and the arithmetic operation of the arithmetic operation unit using the result may also be performed on R×K series of inputs at a minimum. Therefore, the effect of a decrease in the number of arithmetic operation processes of the arithmetic operation unit is considerably larger than that of an increase in the number of Fourier transform processes, a further reduction in the scale of a circuit due to this can be achieved.

In addition, in another example of the present invention, since an arithmetic operation process equivalent to the beam forming process is performed on the result obtained by Fourier transform with respect to the characteristics of the propagation channel, and the multiplication arithmetic operation of the characteristics of the propagation channel and the modulation signal is performed in the frequency domain, whereby a circuit scale for performing an arithmetic operation process for generating a time domain signal can be reduced to M/N as compared with a device of related art, and a system in which N is considerably larger than M can be realized on a small scale.

In addition, in another example of the present invention, since an arithmetic operation process equivalent to the beam forming process is performed on the result of the convolution arithmetic operation of the window function, and the multiplication arithmetic operation of the characteristics of the propagation channel and the modulation signal is performed in the frequency domain, whereby a circuit scale for performing an arithmetic operation process for generating a time domain signal can be reduced to M/N as compared with a device of related art, and a system in which N is considerably larger than M can be realized on a small scale.

BEST MODE FOR CARRYING OUT THE INVENTION

Hereinafter, embodiments of the present invention will be described with reference to the accompanying drawings, but the principle of a testing device of the present invention will be described before the specific configuration thereof is described.

The present invention can be applied as a propagation channel simulator in a case where N×M MIMO (N>M) is performed in the multicarrier modulation scheme such as OFDM, UFMC, GFDM, or FBMC stated above, and is particularly effective in a case where the number of transmitting antennas is very larger than the number of receiving antennas as in 3D-MIMO/Massive-MIMO. Hereinafter, the modulation scheme will be mainly described with the OFDM in mind.

In the present invention, as shown in the following Expression (1), for each time span (for each Tc) of such an extent that a time change in the characteristics of a MIMO propagation channel is negligible, the characteristics of the MIMO propagation channel are assumed to be constant within the time span, and MIMO propagation channel processing is performed in the frequency domain.

$$Tc<<1/f_d \ (f_d: \text{Doppler frequency}) \quad (1)$$

For example, in a case of OFDM, as shown in the following Expression (2), the length Tc obtained by P-dividing one OFDM symbol length $T_{sym}$ (=effective data length+cyclic prefix length) satisfies Expression (1) (P-division may not necessarily equal division).

$$Tc=T_{sym}/P(P=1,2,3,\ldots) \quad (2)$$

Figure 1:
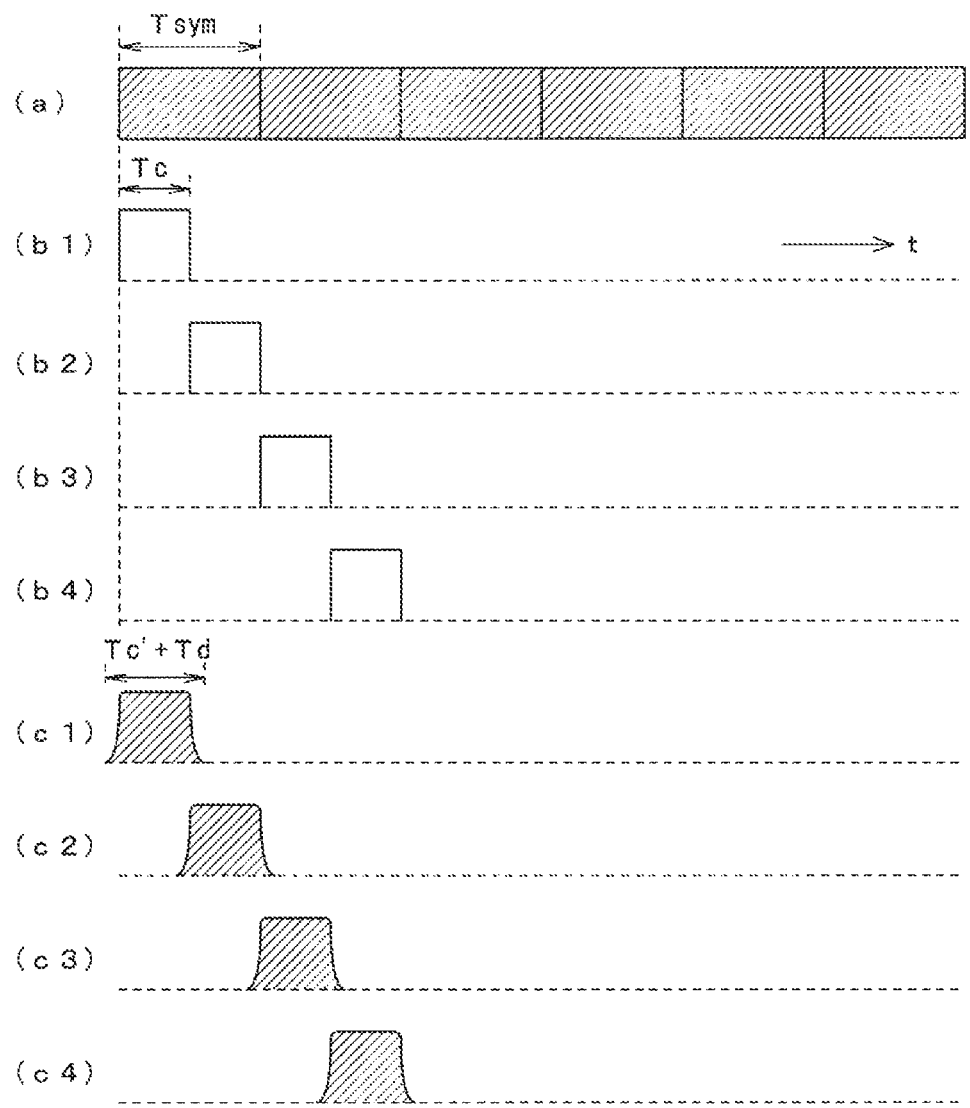
FIG. 1 is a timing diagram illustrating the principle of the present invention.

FIG. 1 shows an example of P=2 in the time domain, a waveform having a multipath propagation process, a filtering process or the like performed on a waveform obtained by multiplying and cutting off a rectangular window function through two-division of one symbol length $T_{sym}$ by Tc=$T_{sym}$/2, as shown in (b1) to (b4) of FIG. 1, with respect to a signal sequence of OFDM shown in (a) of FIG. 1 is obtained in a state of being shifted by Tc as shown in (c1) to (c4) of FIG. 1, and a final transmission signal is obtained by performing an addition process.

The length Tc' of a window function for localization (signal excision) used in reality may be made slightly larger than Tc by rounding ends in order to suppress the extent of corresponding frequency characteristics, and multipath propagation channel processing of a MIMO channel, a filtering process or the like is performed on each waveform multiplied while the timing of this window function is sequentially shifted by Tc. In addition, the time length of every single divided waveform becomes longer than Tc' by the amount of multipath delay time and by Td of the amount of extent due to a filtering process. A waveform added while shifting these lengths by Tc is considered to be a processing result. The waveform of a processing result is calculated by M systems in a case of N×M MIMO propagation channels.

Figure 2:
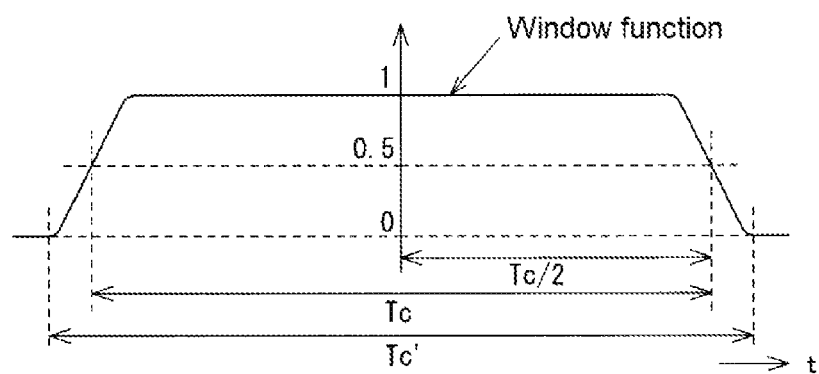
FIG. 2 is a diagram illustrating an example of a window function in the time domain.

FIG. 2 shows the details of a window function for localization (section length: Tc'), and can be, for example, a diagram used in a case where one OFDM symbol is divided into a plurality of parts, or the like. The diagram has characteristics satisfying a Nyquist criterion, and has characteristics that intervals obtained by shifting this window function by Tc are continuous with each other. As the roll-off of the window function in this time domain becomes larger, extent in the frequency domain is further suppressed, and it is possible to suppress the number of taps of a filter in a window function arithmetic operation unit 32 described later.

Figure 3:
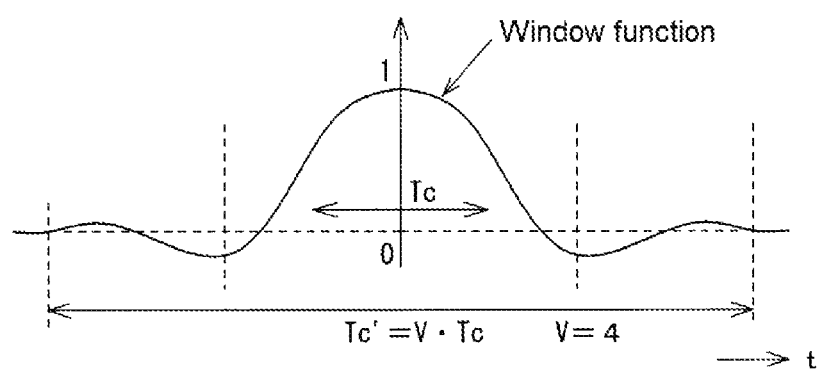
FIG. 3 is a diagram illustrating another example of the window function in the time domain.

In addition, at a time (V·Tc) (V is an overlapping factor) when the modulation scheme is FBMC, and one-symbol information extends, in a case where the characteristics of the MIMO propagation channel can be assumed to be constant (V·Tc<<1/$f_d$), the localization window function itself for FBMC can also be used as shown in FIG. 3.

The process is assumed on a time axis, but an equivalent process in the frequency domain other a final addition process is performed in the present invention, and a process equivalent to a beam forming process performed on a layer signal is performed on other signals in the related art, to thereby reduce the circuit scale of the entire testing device.

Next, an embodiment of a testing device to which the present invention is applied will be described.

Figure 4:
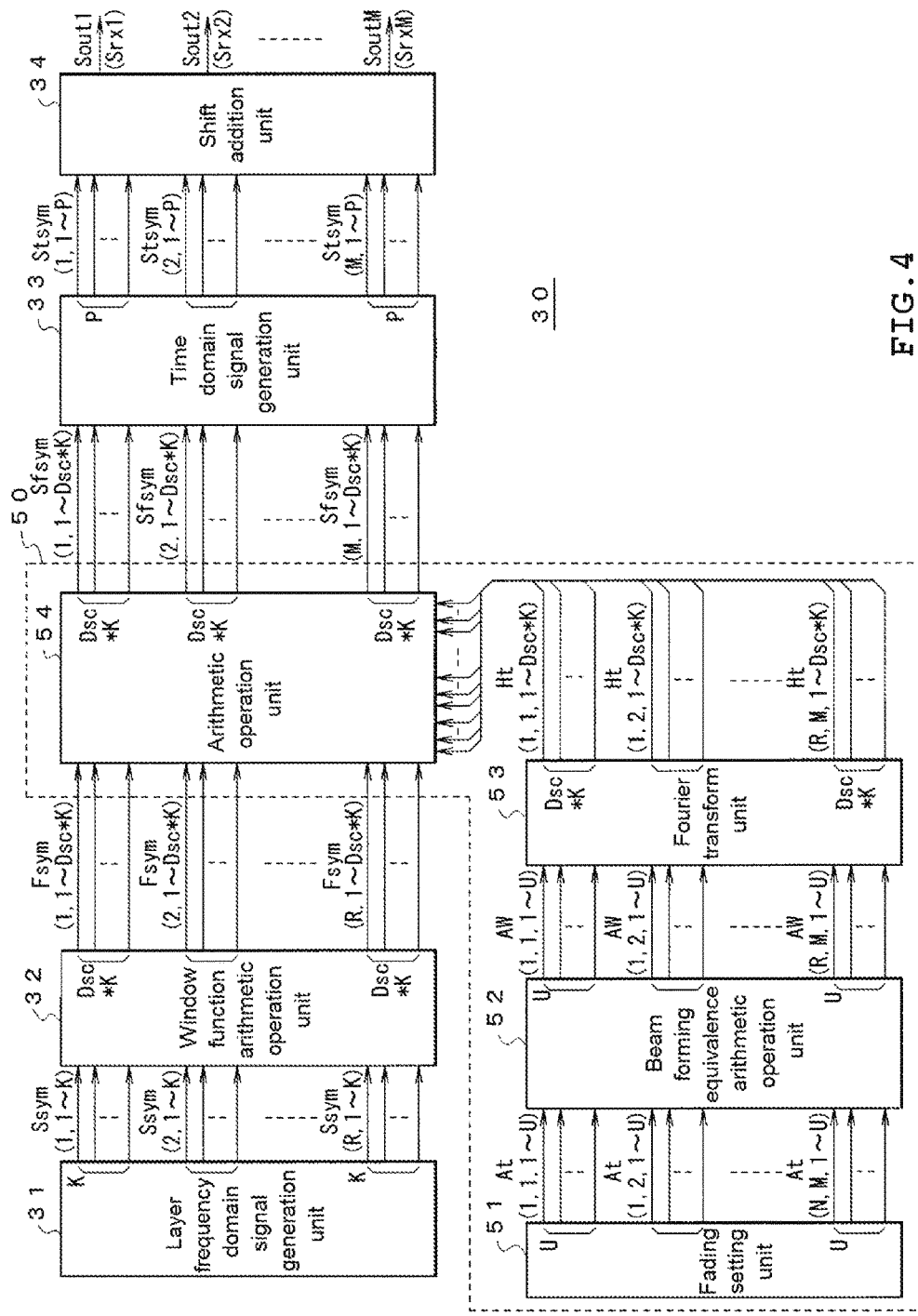
FIG. 4 is a diagram illustrating a configuration of an embodiment of the present invention.

FIG. 4 shows a configuration of a testing device 30 according to the embodiment of the present invention.

The testing device 30 is a device for testing a MIMO scheme system adopting a multicarrier modulation scheme using K carriers in communication with one mobile terminal, a MIMO scheme having the number of transmitting antennas N and the number of receiving antennas M, and a beam forming process scheme for setting radiation beam characteristics based on transmitting antennas having the number of antennas N, in which N×M channels and a pseudo-propagation channel having U paths in each of the channels are assumed between the transmitting antennas and the receiving antennas, and signals received by the M receiving antennas through the propagation channel are generated to be given to a test object. Meanwhile, the following description relates to a case where the multicarrier modulation scheme is OFDM. In the OFDM, a plurality of carriers used in communication with a terminal are called "subcarriers", and thus are referred to as "subcarriers" the following description.

This testing device 30 includes a layer frequency domain signal generation unit 31, a window function arithmetic operation unit 32, a time domain signal generation unit 33, a shift addition unit 34, and a propagation channel simulator 50.

Here, the testing device 30 is constituted by a computer device which is not shown in the drawing. This computer device includes a central processing unit (CPU), a read only memory (ROM), a random access memory (RAM), a digital signal processor (DSP), an integrated circuit (IC), and the like which are not shown in the drawing.

The layer frequency domain signal generation unit 31 generates and outputs modulation signals (constellation data) $S_{sym}(1, 1)$ to $S_{sym}(1, K)$, $S_{sym}(2, 1)$ to $S_{sym}(2, K)$, . . . , $S_{sym}(R, 1)$ to $S_{sym}(R, K)$ for each of K subcarriers with respect to R series of transmission data (called layer or stream) attempted to be transmitted to a test object. This modulation signal is a signal in the frequency domain including R series of pieces of data having K pieces of constellation data lined up on a frequency axis, for each OFDM symbol. Meanwhile, the number of layers R is, in principle, a value equal to or less than the number of receiving antennas M which are test objects.

Here, the constellation data is represented by a complex number of symbols of $S_{sym, r, k}$ as follows.

$$S_{sym, r, k} \quad (3)$$

sym: OFDM symbol number
r={1, 2, 3, . . . , R}: transmission layer number index
k={1, 2, 3, . . . , K}: subcarrier number index Meanwhile, in FIG. 4, the index of a signal $S_{sym, r, k}$ is represented by a form of $S_{sym(r, k)}$, in order to make it easier to understand (the same is true of other signals).

In addition, an interval (subcarrier interval) at which the constellation data is disposed is set to $f_{sc}$. Here, $f_{sc}$ has the following relationship with an OFDM symbol length $T_{sym}$ (=effective data length+cyclic prefix length).

$$\text{Effective data length}=1/f_{sc} \quad (4)$$

$$T_{sym}=(1/f_{sc})+\text{cyclic prefix length} \quad (5)$$

In addition, the window function arithmetic operation unit 32 performs a convolution arithmetic operation of the frequency characteristics of a window function for localization in the time domain with respect to K×R series of modulation signals which are output from the layer frequency domain signal generation unit 31, and obtains a result equivalent to the multiplication of the window function for localization in the time domain (however, the time length of the window function is required to be set to a time length of such an extent that a change in propagation channel characteristics is negligible).

More specifically, the window function arithmetic operation unit 32 performs the following process.

As a process equivalent to the multiplication of a window function for localization $fw_\tau$ ($\tau$ is an index in the direction of a time axis) of the section length Tc' in the time domain, a convolution process is performed on Fourier transform ($Coe_{p,\,i}$) [i is a coefficient index in a frequency direction, and p is the number of a window function in one OFDM symbol] of the window function for localization in the frequency domain.

Here, the multiplication calculation of the window function for localization of a p-th (p=1, 2, 3, . . . , P) section length Tc' obtained by P-dividing one OFDM symbol of the length $T_{sym}$, is mathematized as follows. Here, a sampling interval on a post-process frequency domain is determined in accordance with a magnitude relation between (Tc'+Td) and $1/f_{sc}$ (cycle in the time domain when IFFT is performed at a subcarrier interval $f_{sc}$ of output of the layer frequency domain signal generation unit 31).

(a) In Case of $(Tc'+Td) > 1/f_{sc}$

A sampling interval in the frequency domain is made finer, and thus the waveform of the time length (Tc'+Td) is caused not to generate aliasing (overlap) in the time domain. That is, as shown in the following Expressions (6) and (7), an interpolation coefficient is set to $D_{sc}$, and an interpolation process is performed in order that the relation of $(Tc'+Td) < 1/(f_{sc}/D_{sc})$ is satisfied, and that a sampling interval in the frequency domain of a convolution processing result is set to be times $1/D_{sc}$ (process equivalent to interposing $D_{sc}-1$ zeros between original subcarriers and then performing a filtering process based on the convolution).

$$F_{sym,\,p,\,r,\,k'} = \Sigma S_{sym,\,r,\,[(k'-g)/Dsc+<K/2>+1]-i} \cdot Coe_{p,\,Dsc\cdot i+g,\,g=k'\%Dsc} \quad (6)$$

$$Coe_{p,\,Dsc\cdot i+g} = DFT(fw_\tau) \cdot e^Z \cdot window(Dsc\cdot i+g),\ Z=-j2\pi \cdot fsc \cdot (i+g/Dsc) \cdot Tc \cdot (\tfrac{1}{2}+p-1) \quad (7)$$

Here, the symbol $\Sigma$ of Expression (6) indicates the sum of i=−TapNum/2 to TapNum/2. In addition, in a window(i), its tap length is assumed to be a window function of $D_{sc}$·(TapNum+1). $DFT(fw_\tau)$ is discrete Fourier transform over a time span $1/(f_{sc}/D_{sc})$. Here, $fw_\tau$ is assumed to be a waveform in which its center is located at time 0, and moves a position corresponding to p in a case where a waveform is retarded by $Tc\cdot(\tfrac{1}{2}+p-1)$.

In addition, $e^Z$ of Expression (7) is a term for giving rotation on the frequency domain equivalent to retarding a waveform by $Tc\cdot(\tfrac{1}{2}+p-1)$ in the time domain.

In addition, in Expression (6), k' indicates a frequency index after the interpolation process.

$$k' = \{D_{sc}\cdot(0-<K/2>), D_{sc}\cdot(1-<K/2>), \ldots, D_{sc}\cdot(K-1-<K/2>)\}$$

However, a modulation wave $S_{sym,\,r,\,k}$ of k={1, 2, 3, . . . K} has a corresponding relation to the position of the frequency index. Meanwhile, the angle bracket symbol <A> of Expression (6) indicates a maximum integer that does not exceed A (and so forth).

In addition, the symbol % of Expression (6) is a remainder operator, and g is the remainder when k' is divided by $D_{sc}$. However, Expression (6) is required to be calculated in the following range, and $S_{sym,\,r,\,i}=0$ is set in a range of i<0 and i>K.

$$-D_{sc}\cdot(<K/2>+TapNum/2) \leq k' \leq D_{sc}\cdot(<K/2>+TapNum/2)$$

(b) In Case of $(Tc'+Td) < 1/f_{sc}$

As shown in the following Expressions (8) and (9), the sampling interval of a convolution processing result is subject to a convolution process so as to be unchanged from the output of the frequency domain signal generation unit 31 (no interpolation).

$$F_{sym,\,p,\,r,\,k'} = \Sigma S_{sym,\,r,\,(k'+<K/2>+1)-i} \cdot Coe_{p,\,i} \quad (8)$$

$$Coe_{p,\,i} = DFT(fw_\tau) \cdot e^{Z'} \cdot window(i),\ Z' = -j2\pi \cdot fsc \cdot i \cdot Tc \cdot (\tfrac{1}{2}+p-1) \quad (9)$$

Here, the symbol $\Sigma$ of Expression (8) indicates the sum of i=−TapNum/2 to TapNum/2. In addition, in a window (i), its tap length is assumed to be a window function of (TapNum+1). $DFT(fw_\tau)$ is discrete Fourier transform over a time span $1/f_{sc}$. Here, $fw_\tau$ is assumed to be a waveform in which its center is located at time 0, and moves a position corresponding to p in a case where a waveform is retarded by $Tc\cdot(\tfrac{1}{2}+p-1)$.

In addition, $e^{Z'}$ of Expression (9) is a term for giving rotation on the frequency domain equivalent to retarding a waveform by $Tc\cdot(\tfrac{1}{2}+p-1)$ in the time domain.

In addition, in Expression (8), k' indicates a frequency index.

$$k' = \{-<K/2>, 1-<K/2>, \ldots, K-1-<K/2>\}$$

However, a modulation wave $S_{sym,\,r,\,k}$ Of k={1, 2, 3, . . . K} has a corresponding relation to the position of the frequency index. However, Expression (8) is required to be calculated in the following range, and $S_{sym,\,r,\,i}=0$ is set in a range of i<0 and i>K.

$$-(<K/2>+TapNum/2) \leq k' \leq (<K/2>+TapNum/2)$$

The propagation channel simulator 50 is used in giving Rayleigh fading indicating a distribution of reception level fluctuations in wireless communication, but performs a process of giving fading in the frequency domain in the present embodiment.

This propagation channel simulator 50 includes a fading setting unit 51, a beam forming equivalence arithmetic operation unit 52, a Fourier transform unit 53 and an arithmetic operation unit 54.

The fading setting unit 51 gives fluctuations according to a Rayleigh distribution to amplitude characteristics and phase characteristics for all paths that form a propagation channel, and obtains propagation channel characteristics At including a Doppler shift or the like due to the movement of a test object.

Figure 5:
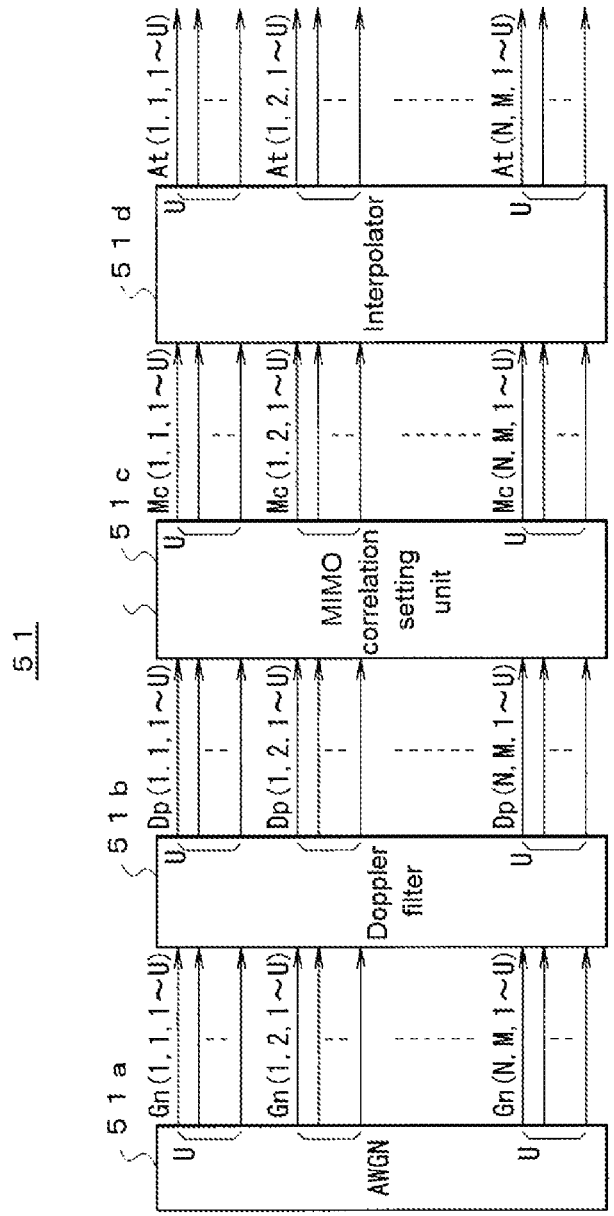
FIG. 5 is a configuration diagram of main parts of the embodiment of the present invention.

The configuration of this fading setting unit 51 is arbitrary. However, for example, as shown in FIG. 5, the fading setting unit inputs white Gaussian noise signals Gn (1, 1, 1 to U) to Gn (N, M, 1 to U) based on a Rayleigh distribution generated by an additive white Gaussian noise generator (AWGN) 51*a* to a Doppler filter 51*b* to give a Doppler spectrum, inputs the outputs Dp (1, 1, 1 to U) to Dp (N, M, 1 to U) to a MIMO correlation setting unit 51*c* to give a MIMO correlation, and inputs the outputs Mc (1, 1, 1 to U) to Mc (N, M, 1 to U) to an interpolator 51*d* to output the outputs as propagation channel characteristics At (1, 1, 1 to U) to At (N, M, 1 to U) for each path. Meanwhile, the interpolator 51*d* is used in performing an interpolation process for adapting a rate to signal excision at a Tc interval performed by the window function arithmetic operation unit 32 and the characteristics of a propagation channel multiplied by the signal excision. In addition to this configuration, it is also possible to adopt a scheme for obtaining the characteristics of a propagation channel by a combination of a large number of complex waves.

The beam forming equivalence arithmetic operation unit 52 performs an arithmetic operation process equivalent to a beam forming process scheme for setting radiation beam characteristics based on transmitting antennas having the number of antennas N with respect to N×M×U paths' worth of propagation channel characteristics At obtained in the fading setting unit 51, and obtains the propagation channel characteristics of all paths to which the radiation beam characteristics of the transmitting antennas are added.

This beam forming process is a process of multiplying the input propagation channel characteristics At by a beam forming matrix W designated in advance so that desired radiation beam characteristics are obtained.

The Fourier transform unit 53 gives a delay to the propagation channel characteristics AW of all the paths obtained by the beam forming equivalence arithmetic operation unit 52 to perform Fourier transform on the resultant, and thus generates a signal Ht in the frequency domain indicating the characteristics of the MIMO propagation channel.

Specifically, the Fourier transform unit performs Fourier transform of impulse response×beam forming matrix of R×M channels, for each time length Tc. In a case where the number of paths of each channel is set to U, the impulse response of propagation channel characteristics At, r, m, u between an r-th transmission layer and an m-th receiving antenna at a time t is represented by the following expression.

$$H_{t, r, m} = \Sigma A_{t, r, m, u} \cdot \delta(t-\tau_u) \tag{10}$$

Here, the symbol Σ indicates the sum of u=1 to U.

This Fourier transform can be represented by the following Expression (11).

$$H_{t, n, m, k'} = \Sigma A_{t, n, m, u} \cdot e^{y}, \ y = -2\pi \cdot \tau_{u'} \Delta f \cdot k' \tag{11}$$

Here, the symbol Σ indicates the sum of u=1 to U. In addition, k' is an index on a frequency axis, and the following range is taken.

$$-D_{sc'}(<K/2>+\text{TapNum}/2) \leq k' \leq D_{sc'}(<K/2>+\text{TapNum}/2)$$

In addition, Δf indicates a subcarrier interval.

As shown in Expression (11), the Fourier transform unit 53 is constituted by only arithmetic operation blocks of rotation and cumulative addition, and delay information is included in rotation information. Therefore, the scale of a circuit can be considerably reduced as compared with a configuration in which a delay is given to each path by a combination of a memory and a resampling filter as in a device of related art.

The arithmetic operation unit 54 multiplies the arithmetic operation result of the window function arithmetic operation unit 32 by the output of the Fourier transform unit 53, to thereby give the MIMO propagation channel characteristics in the time domain in the frequency domain, and obtains information (spectrum information) of the frequency domain of a signal received by each receiving antenna.

In this process, as shown in the following Expression (12), propagation channel matrix is multiplied for each frequency index k', and thus a received signal in the frequency domain of the m-th receiving antenna is calculated.

$$Sf_{sym, p, m, k'} = \Sigma H_{t, r, m, k'} F_{sym, p, r, k'} \tag{12}$$

Here, the symbol Σ indicates the sum of r=1 to R, and the time index t of Ht, r, m, k' is assumed to be a time corresponding to (sym, p). Similarly to the above, the index k' on a frequency axis is assumed to take the following range.

$$-D_{sc'}(<K/2>+\text{TapNum}/2) \leq k' \leq D_{sc'}(<K/2>+\text{TapNum}/2)$$

Figure 6:
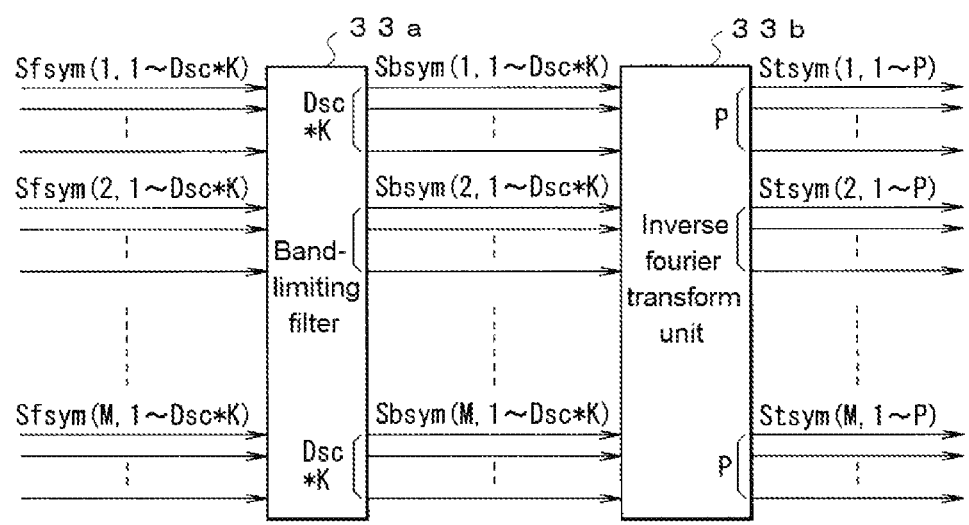
FIG. 6 is a configuration diagram of main parts of the embodiment of the present invention.

In this manner, the signal $Sf_{sym, p, m, k'}$ to which the MIMO propagation channel characteristics in the frequency domain are given by the propagation channel simulator 50 is input to the time domain signal generation unit 33. As shown in FIG. 6, the time domain signal generation unit 33 includes a band-limiting filter 33a and an inverse Fourier transform unit 33b.

As shown in the following Expression (13), the band-limiting filter 33a performs multiplication in the frequency domain of the characteristics (BandFilk) of the band-limiting filter with respect to the input signal $Sf_{sym, p, m, k'}$, and performs band limitation. Meanwhile, this band-limiting process can be omitted.

$$Sb_{sym, p, m, k'} = Sf_{sym, p, m, k'} \cdot \text{BandFil}_{k'} \tag{13}$$

As shown in the following Expression (14), the inverse Fourier transform unit 33b performs high-speed inverse Fourier transform IFFT with respect to the signal $Sb_{sym, p, m, k'}$ (or output signal $Sf_{sym, p, m, k'}$ of the propagation channel simulator 50) in a band-limited frequency domain, and thus converts the signal into a signal $St_{sym, p, m, \tau}$ in the time domain.

$$St_{sym, p, m, \tau} = \text{IFFT}(Sb_{sym, p, m, k'}) \tag{14}$$

Here, τ={1, 2, 3, . . . , Nfft} is assumed to be a time index. Nfft is assumed to be the number of FFT points.

Further, in a case where k' is in the following range, $$D_{sc'}(<K/2>+\text{TapNum}/2) < k' < \text{Nfft} - D_{sc'}(<K/2>+\text{TapNum}/2)$$

a relation of $Sb_{sym, p, m, k'} = 0$ is established, and $Sb_{sym, p, m, k'}$ is periodic using Nfft as a period. That is, it is assumed that a relation of $Sb_{sym, p, m, k'} = Sb_{sym, p, m, (k'+i \cdot Nfft)}$ is established with respect to an integer i.

This signal $St_{sym, p, m, \tau}$ converted into the time domain is shifted by a length in the time domain of the window function and is sequentially added by the shift addition unit 34, as shown in the following Expression (15), and a received signal of which the continuity is maintained is generated. That is, the process result of Expression (14) is added while being shifted by a time Tc as shown in FIG. 1, and thus a series of consecutive received signals are obtained. This process is performed in parallel by M series, and thus M series of consecutive received signals can be generated.

$$Sout_{m, \tau} = \sum_{sym} \sum_{p=1}^{P} St_{sym, p, m, \tau} - Tc \cdot fs \cdot [p - 1 + (sym - 1) \cdot P] \tag{15}$$

In Expression (15), fs is assumed to be a sampling frequency in the time domain.

Meanwhile, the beam forming process is normally performed on the output of the layer frequency domain signal generation unit 31. As in this embodiment, even in a case where the process is performed on the output of the fading setting unit 51, final calculation results become the same as each other. These results are shown as follows.

A matrix [Ss] of a modulation signal of original R layers, a matrix [Ss'] of a signal on which window function processing is performed, a beam forming matrix [W], a matrix [a0] of the characteristics of a propagation channel of channels between a transmitting antenna and a receiving antenna, a matrix [H0] on which Fourier transform of the impulse response is performed, and a matrix [Sf] of the output of the arithmetic operation unit 54 indicate as follows. Here, symbol Fourie {B} indicates Fourier transform of B.

$$[Ss] = \begin{bmatrix} S_{sym,1,k} \\ S_{sym,2,k} \\ \vdots \\ S_{sym,R,k} \end{bmatrix},$$

$$[Ss'] = \begin{bmatrix} S_{sym,1,k'} \\ S_{sym,2,k'} \\ \vdots \\ S_{sym,R,k'} \end{bmatrix}$$

$$[W] = \begin{bmatrix} W_{1,1} & W_{1,2} & \cdots & W_{1,R} \\ W_{2,1} & W_{2,2} & \cdots & W_{2,R} \\ \vdots & \vdots & & \vdots \\ W_{N,1} & W_{N,2} & \cdots & W_{N,R} \end{bmatrix}$$

$$[H0] = \begin{bmatrix} H0_{t,1,1,k'} & H0_{t,2,1,k'} & \cdots & H0_{t,N,1,k'} \\ H0_{t,1,2,k'} & H0_{t,2,2,k'} & \cdots & H0_{t,N,2,k'} \\ \vdots & \vdots & & \vdots \\ H0_{t,1,M,k'} & H0_{t,2,M,k'} & \cdots & H0_{t,N,M,k'} \end{bmatrix}$$

$$= \text{Fourier} \left\{ \begin{bmatrix} a0_{t,1,1,u} & a0_{t,2,1,u} & \cdots & a0_{t,N,1,u} \\ a0_{t,1,2,u} & a0_{t,2,2,u} & \cdots & a0_{t,N,2,u} \\ \vdots & \vdots & & \vdots \\ a0_{t,1,M,u} & a0_{t,2,M,u} & \cdots & a0_{t,N,M,u} \end{bmatrix} \right\}$$

$$[Sf] = \begin{bmatrix} Sf_{sym,p,1,k'} \\ Sf_{sym,p,2,k'} \\ \vdots \\ Sf_{sym,p,M,k'} \end{bmatrix}$$

In a case where the beam forming process is performed on a modulation signal sequence of R layers, the following Expression (16) is established. Symbol INTP {C} indicates window function processing for C.

$$[Sf] = [H0]\text{INTP}\{[W][Ss]\} = [H0][W]\text{INTP}\{[Ss]\} = [H0][W][Ss'] \quad (16)$$

In Expression (16), the matrix [H0] after Fourier transform is represented by the matrix [a0] of original characteristics, and the development thereof can be represented as follows.

$$[Sf] = \Sigma\{[a0]e^Z\}[W][Ss'] \quad (17)$$

$$= \Sigma\{[a0][W]e^Z\}[Ss']$$

$$Z = -2\pi \tau_u \cdot \Delta f \cdot k' \quad (18)$$

Here, the symbol Σ indicates the sum of u=1 to U.

The term of $\Sigma\{[a0][W]e^Z\}$ in Expression (18) is obtained by applying Fourier transform to a result (AW) of multiplying the fading characteristics [a0] of the propagation channel by the beam forming matrix. The arithmetic operation result of the Fourier transform is multiplied by the signal [Ss'] obtained in the window function processing, and thus a process according to the configuration of the embodiment is realized. That is, as in the embodiment, even in a case where the beam forming process is performed on the output of the fading setting unit 51, the final arithmetic operation result does not change.

In this manner, the testing device 30 of the embodiment performs Fourier transform by performing a convolution arithmetic operation of the frequency characteristics of a window function with respect to a modulation signal for each subcarrier of R layers, as a process in the frequency domain equivalent to signal excision based on the multiplication of the window function in the time domain, and performing an arithmetic operation process equivalent to the beam forming process with respect to propagation channel characteristics of all paths, obtains propagation channel characteristics in the frequency domain, obtains information (spectrum information) in the frequency domain of a signal received in each receiving antenna by the multiplication of the propagation channel characteristics in the frequency domain by the result of the convolution arithmetic operation of the frequency characteristics of the window function, applies an inverse Fourier transform process to the obtained information to generate a signal in the time domain, and shifts and adds the generated signal by the length of the window function, to thereby generate consecutive received signals received in each receiving antenna.

Therefore, as compared with a case where propagation channel characteristics are given while inverse Fourier transform is applied to a signal in the frequency domain for each transmitting antenna and the signal is converted into a signal in the time domain as in a scheme of related art, the scale of a circuit that performs inverse Fourier transform can be considerably reduced.

For example, in a case of N=128, M=8, the number of layers R=2, the number of subcarriers K, inverse Fourier transform is required to be applied to a set of K signals in parallel by 128 (=N) sets in order to generate a time domain signal as in a scheme of related art, but in the present embodiment, inverse Fourier transform may be applied to a set of $D_{sc} \cdot K$ signals in parallel by 8 (=M) sets. Here, in a case where an interpolation coefficient $D_{sc}$ is 1 (in a case of no interpolation), the number of times of multiplication can be reduced to M/N.

In addition, in a case of interpolation, the number of times of multiplication can be reduced to the following.

$$(M \cdot 2^{L'} \cdot \log_2 2^{L'}) / (N \cdot 2^L \cdot \log_2 2^L)$$

In a case where a relation of $D_{sc} \cdot M < N$ is established, it is possible to realize the number of times of multiplication smaller than that of a circuit of related art. Herein L is an integer satisfying a relation of $(2^{L-1}) < K \leq 2^L$, and L' is an integer satisfying a relation of $(2^{L'-1}) < D_{sc} \cdot K \leq 2^{L'}$.

Furthermore, a configuration is used in which the beam forming process is performed on the characteristics of a propagation channel which are output by the fading setting unit 51, and thus the window function arithmetic operation unit 32 is configured to output R×K series of signal sequences at a minimum ($D_{sc}$=1) in an arithmetic operation process for R×K series of signal sequences. In addition, the arithmetic operation unit 54 is also configured to perform an arithmetic operation process for R×K series of signal sequences at a minimum.

Therefore, when the number of layers R is set to 2 in a case of, for example, the number of transmitting antennas N=128 and the number of receiving antennas M=4, an arithmetic operation process can be performed with a circuit scale of R/N=1/64 in general calculation as compared with a case where an arithmetic operation process of N×K series of signal sequences in related art is performed on a time axis. Even in a case where the number of layers R is made equal to M, an arithmetic operation process can be performed with a circuit scale of R/N=1/32.

In addition, in a case of the present embodiment, a Fourier transform process for converting fading information into the frequency domain is required, but in this Fourier transform process, the amount of delay of each path in the time domain corresponds to the rotational speed of a frequency component of each path in the frequency domain. Therefore, hardware in which a delay is given to each path by a combination of a memory and a resampling filter performed in the time domain of related art is replaced by a rotation process in Fourier transform, and the present embodiment is considerably advantageous when both the scales of hardware are compared with each other. Furthermore, the number of sequences of a signal on which a Fourier transform process is performed is reduced to R/N by performing the beam forming process before Fourier transform, and thus an increase in the scale of a circuit is slight.

In the embodiment, an arithmetic operation process equivalent to the beam forming process is performed on the output of the fading setting unit 51, but Expression (16) can be deformed as follows.

$$[Sf] = [H0][W][Ss'] = \{[H0][W]\} \times [Ss'] \quad (16a)$$

$$= [H0] \times \{[W][Ss']\} \quad (16b)$$

Figure 7:
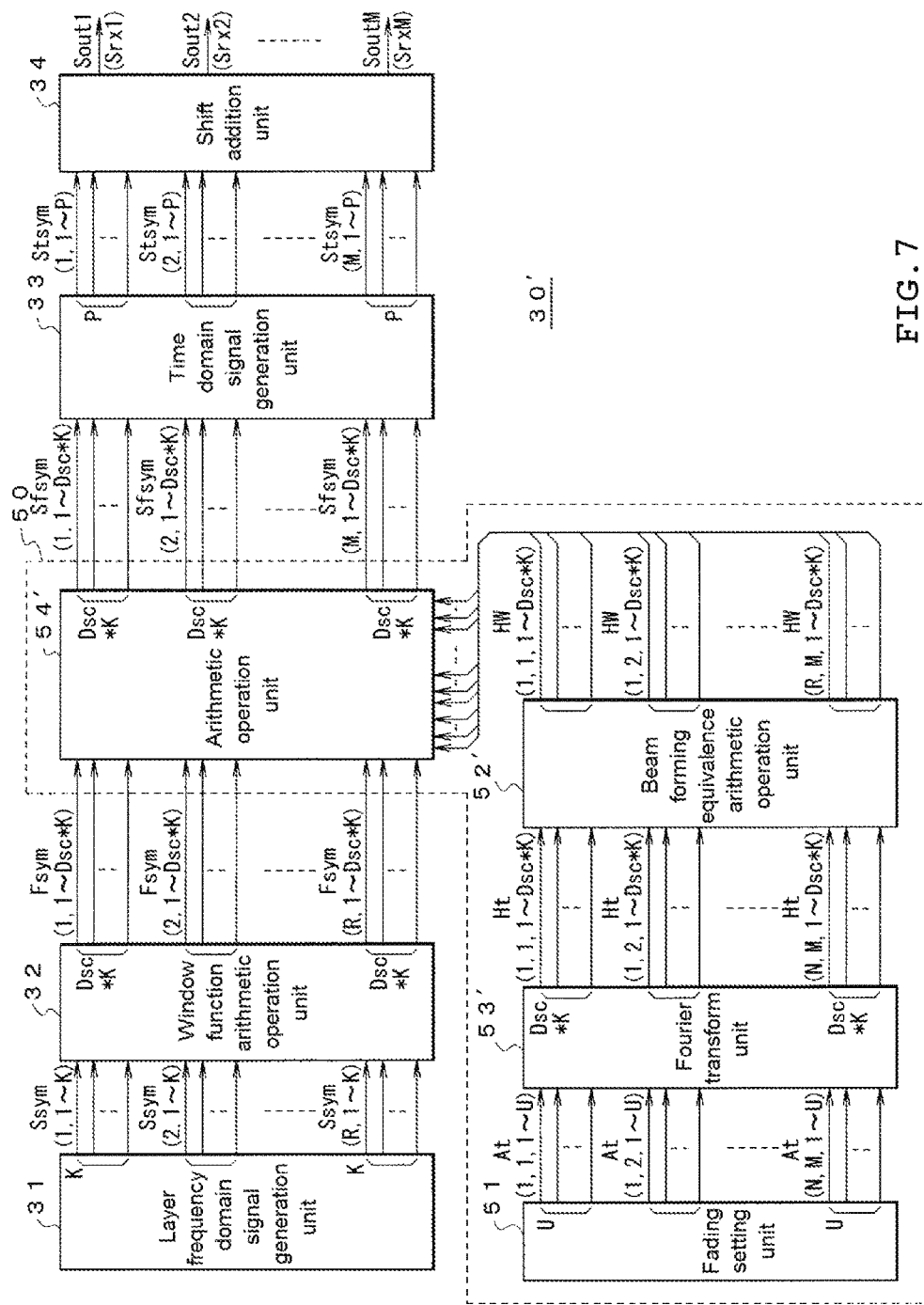
FIG. 7 is a diagram illustrating a configuration of another embodiment of the present invention.

Expression (16a) is obtained by multiplying a result obtained in the arithmetic operation of {[H0][W]} by [Ss'], and is configured such that, as in a testing device 30' shown in FIG. 7, a Fourier transform process for the output of the fading setting unit 51 is performed by a Fourier transform unit 53', and that a result HW obtained by performing a multiplication process of the beam forming matrix [W] in a beam forming equivalence arithmetic operation unit 52' with respect to the arithmetic operation result Ht (equivalent to [H0]) and an arithmetic operation result $F_{sym}$ (equivalent to [Ss']) of the window function arithmetic operation unit 32 are multiplied together by an arithmetic operation unit 54'.

Figure 8:
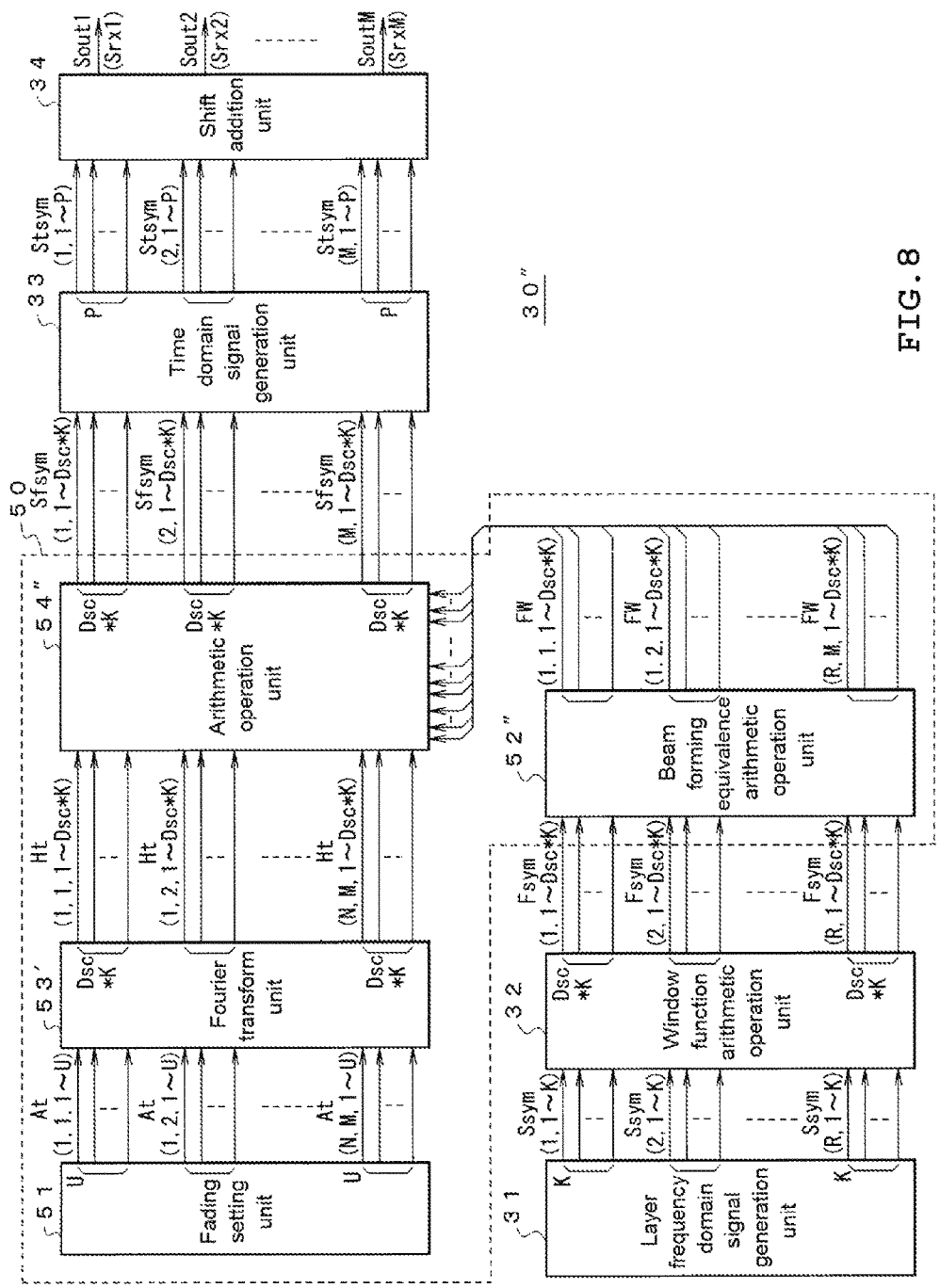
FIG. 8 is a diagram illustrating a configuration of another embodiment of the present invention.
Figure 9:
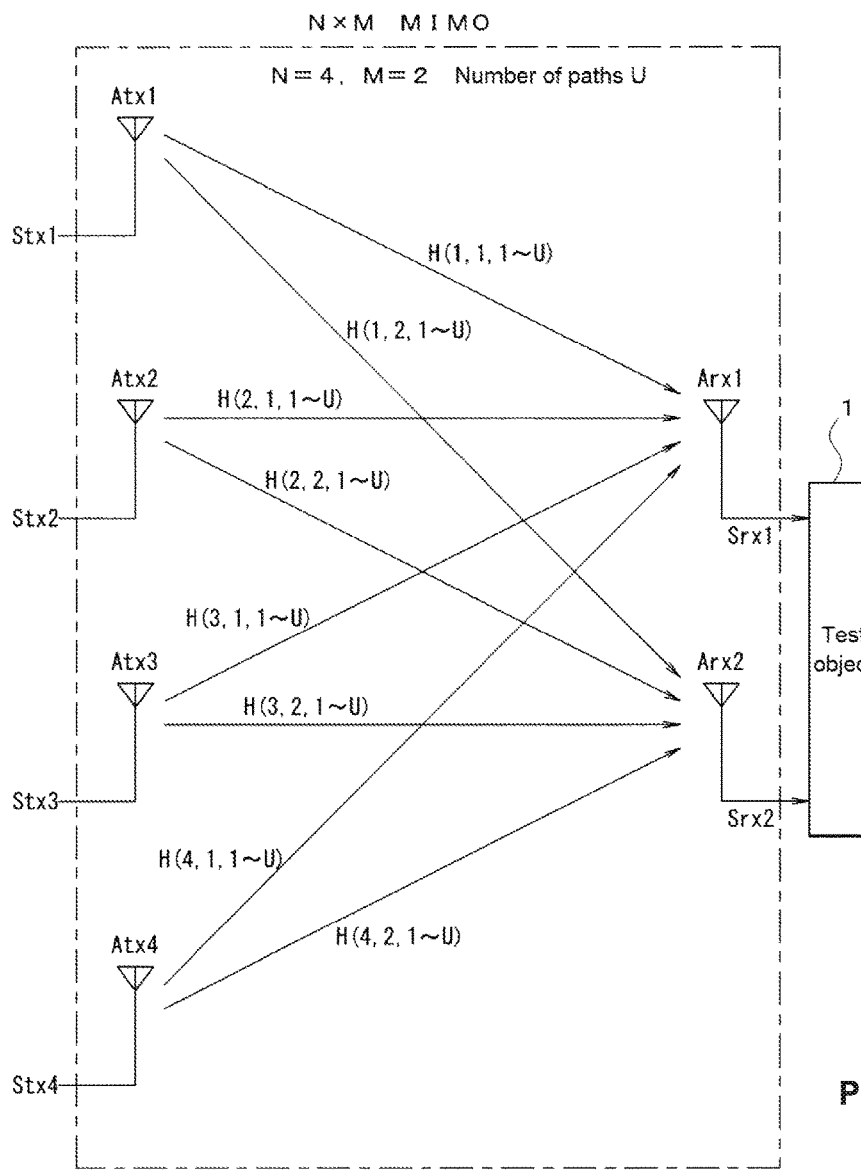
FIG. 9 is a diagram illustrating of an example of a propagation channel of multipath MIMO.
Figure 10:
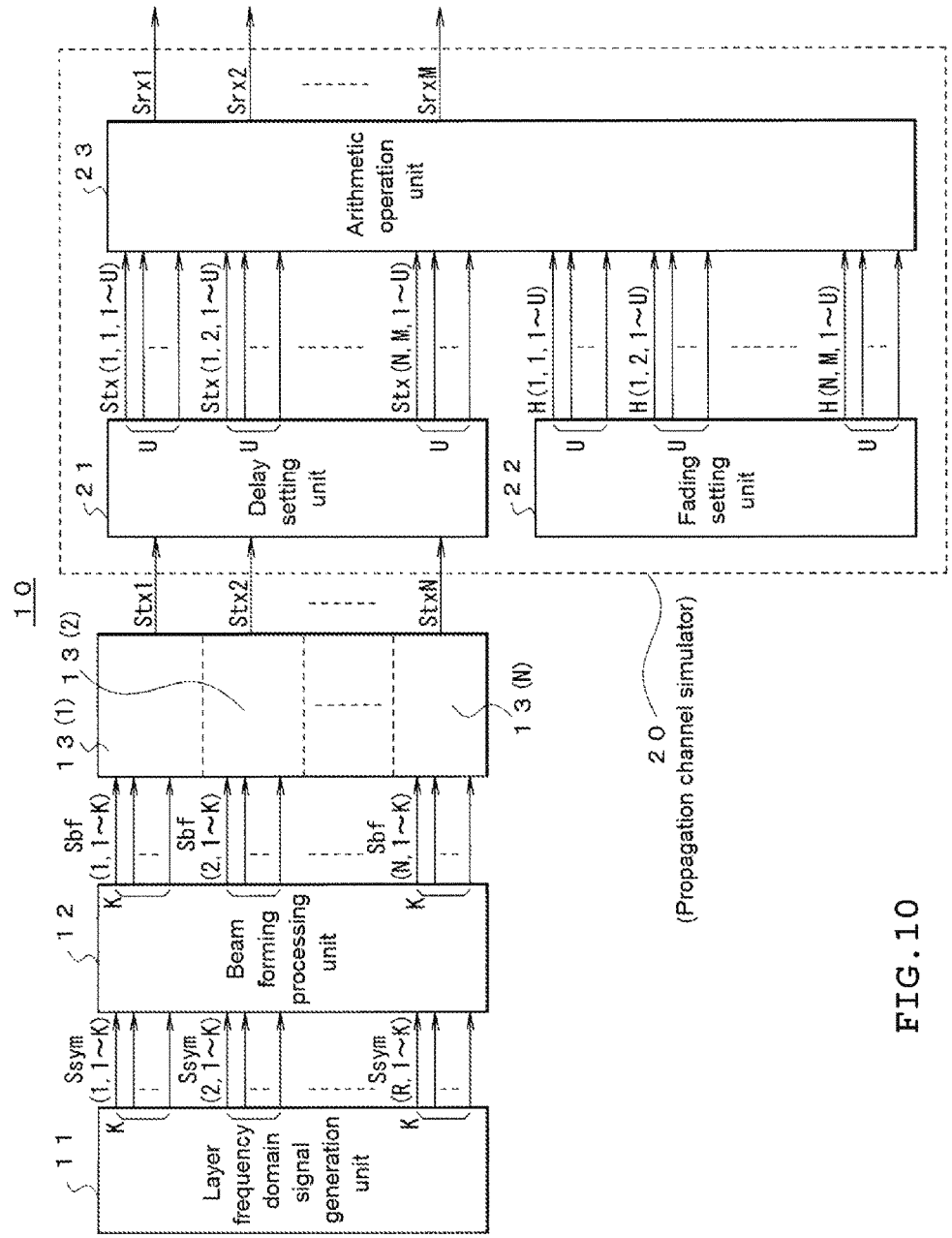
FIG. 10 is a configuration diagram of a device of related art.

In addition, Expression (16b) is obtained by multiplying a result obtained in an arithmetic operation of {[W][Ss']} by [H0], and is configured such that, as in a testing device 30" shown in FIG. 8, a result Ht (equivalent to [H0]) obtained by performing a Fourier transform process for the output of the fading setting unit 51 in the Fourier transform unit 53' and a result FW obtained by performing a multiplication process of the beam forming matrix [W] on the arithmetic operation result $F_{sym}$ (equivalent to [Ss']) of the window function arithmetic operation unit 32 in a beam forming equivalence arithmetic operation unit 52" are multiplied together by an arithmetic operation unit 54".

A case of these testing devices 30' and 30" is also the same as that in the embodiment, in that a multiplication arithmetic operation of the characteristics of a propagation channel and a modulation signal is performed in the frequency domain. A circuit scale for performing an arithmetic operation process for generating a time domain signal can be reduced to M/N as compared with a device of related art, and a system in which N is considerably larger than M can be realized on a small scale.

Meanwhile, in the embodiment, the time domain signal generation unit 33 is provided with the band-limiting filter 33a, but the output of the arithmetic operation unit 54 may be input directly to the inverse Fourier transform unit 33b in a state where the band-limiting filter is omitted.

In addition, the process of the band-limiting filter can also be performed in the time domain after the inverse Fourier transform process. However, in that case, it is necessary to perform a convolution arithmetic operation process on a signal in the time domain obtained in the inverse Fourier transform process. On the other hand, as in the present embodiment, in a case where the band-limiting filter is provided at the preceding stage of the inverse Fourier transform process, it is possible to finish a filtering process with a multiplication process in the frequency domain, to execute a process with the amount of an arithmetic operation considerably smaller than that of a convolution arithmetic operation, and to perform a high-speed process even in a case where the band-limiting filter is provided.

In addition, the above description has been given in a case where the multicarrier modulation scheme is OFDM, but the present invention can be similarly applied to a MIMO system using UFMC, GFDM, FBMC and the like which are other multicarrier modulation schemes.

Particularly, in a 3D-MIMO/Massive-MIMO expected to be used in the fourth-generation Evolution and the fifth-generation cellular phone scheme, the number of transmitting antennas of a base station is predominantly larger than the number of receiving antennas of a mobile machine, and thus the present invention is considerably effective.

DESCRIPTION OF REFERENCE NUMERALS AND SIGNS

1: test object
30, 30', 30": testing device of MIMO scheme system
31: layer frequency domain signal generation unit
32: window function arithmetic operation unit
33: time domain signal generation unit
33a: band-limiting filter
33b: inverse Fourier transform unit
34: shift addition unit
50: propagation channel simulator
51: fading setting unit
51a: AWGN
51b: Doppler filter
51c: MIMO correlation setting unit
51d: interpolator
52, 52', 52": beam forming equivalence arithmetic operation unit
53, 53': Fourier transform unit
54, 54', 54": arithmetic operation unit

What is claimed is:

1. A device for testing a multi input multi output ("MIMO") scheme system adopting a multicarrier modulation scheme using K carriers in communication with one mobile terminal,
a MIMO scheme having the number of transmitting antennas N and the number of receiving antennas M, and a beam forming process scheme for setting radiation beam characteristics based on transmitting antennas having the number of antennas N, in which N×M channels and
a pseudo-propagation channel having U paths in each of the channels are assumed between the transmitting antennas and the receiving antennas, and signals received by the M receiving antennas through the propagation channel are generated to be given to a test object, the device comprising:
a layer frequency domain signal generation unit that generates R×K series of modulation signals in a frequency domain for each of the K carriers with the input of R layers' worth of data signal sequences to be transmitted to the test object;
a window function operation unit that performs a convolution operation of frequency characteristics of a window function in a time domain with the input of the R×K series of modulation signals, output by the layer frequency domain signal generation unit, as a process equivalent to signal excision based on multiplication of the window function in the time domain;

a fading setting unit that obtains propagation channel characteristics of all paths assumed between the transmitting antennas and the receiving antennas;

a beam forming equivalence operation unit that performs an operation process equivalent to the beam forming process for setting the radiation beam characteristics based on the transmitting antennas having the number of antennas N to desired characteristics, with the input of the N×M×U paths' worth of propagation channel characteristics obtained in the fading setting unit;

a Fourier transform unit that performs Fourier transform taking account of a delay for each path with the input of the propagation channel characteristics of all paths obtained by the beam forming equivalence operation unit, and obtains propagation channel characteristics in the frequency domain;

an operation unit that obtains spectrum information of a signal to be received in each of the receiving antennas by multiplications of the propagation channel characteristics in the frequency domain obtained by the Fourier transform unit and operation results of the window function operation unit;

a time domain signal generation unit that performs inverse Fourier transform processes with the input of the operation results of the operation unit, and generates signals in the time domain to be received by the receiving antennas; and a shift addition unit that shifts and adds the signals in the time domain generated by the time domain signal generation unit by a length of the window function in the time domain, and generates consecutive signals to be received by the receiving antennas.

2. A device for testing a multi input multi output ("MIMO") scheme system adopting a multicarrier modulation scheme using K carriers in communication with one mobile terminal, a MIMO scheme having the number of transmitting antennas N and the number of receiving antennas M, and a beam forming process scheme for setting radiation beam characteristics based on transmitting antennas having the number of antennas N, in which N×M channels and a pseudo-propagation channel having U paths in each of the channels are assumed between the transmitting antennas and the receiving antennas, and signals received by the M receiving antennas through the propagation channel are generated to be given to a test object, the device comprising:

a layer frequency domain signal generation unit that generates R×K series of modulation signals in a frequency domain for each of the K carriers with the input of R layers' worth of data signal sequences to be transmitted to the test object;

a window function operation unit that performs a convolution operation of frequency characteristics of a window function in a time domain with the input of the R×K series of modulation signals, output by the layer frequency domain signal generation unit, as a process equivalent to signal excision based on multiplication of the window function in the time domain;

a fading setting unit that obtains propagation channel characteristics of all paths assumed between the transmitting antennas and the receiving antennas;

a Fourier transform unit that performs Fourier transform taking account of a delay for each path with the input of the propagation channel characteristics of all paths obtained in the fading setting unit, and obtains propagation channel characteristics in the frequency domain;

a beam forming equivalence operation unit that performs an operation process equivalent to the beam forming process for setting the radiation beam characteristics based on the transmitting antennas having the number of antennas N to desired characteristics, with the input of the propagation channel characteristics in the frequency domain obtained in the Fourier transform unit;

an operation unit that obtains spectrum information of a signal to be received in each of the receiving antennas by multiplications of the operation result of the beam forming equivalence operation unit and the operation results of the window function operation unit;

a time domain signal generation unit that performs inverse Fourier transform processes with the input of the operation results of the operation unit, and generates signals in the time domain to be received by the receiving antennas; and a shift addition unit that shifts and adds the signals in the time domain generated by the time domain signal generation unit by a length of the window function in the time domain, and generates consecutive signals to be received by the receiving antennas.

3. A device for testing a multi input multi output ("MIMO") scheme system adopting a multicarrier modulation scheme using K carriers in communication with one mobile terminal, a MIMO scheme having the number of transmitting antennas N and the number of receiving antennas M, and a beam forming process scheme for setting radiation beam characteristics based on transmitting antennas having the number of antennas N, in which N×M channels and a pseudo-propagation channel having U paths in each of the channels are assumed between the transmitting antennas and the receiving antennas, and signals received by the M receiving antennas through the propagation channel are generated to be given to a test object, the device comprising:

a layer frequency domain signal generation unit that generates R×K series of modulation signals in a frequency domain for each of the K carriers with the input of R layers' worth of data signal sequences to be transmitted to the test object;

a window function operation unit that performs a convolution operation of frequency characteristics of a window function in a time domain with the input of the R×K series of modulation signals, output by the layer frequency domain signal generation unit, as a process equivalent to signal excision based on multiplication of the window function in the time domain;

a beam forming equivalence operation unit that performs an operation process equivalent to the beam forming process for setting the radiation beam characteristics based on the transmitting antennas having the number of antennas N to desired characteristics, with the input of operation results of the window function operation unit;

a fading setting unit that obtains propagation channel characteristics of all paths assumed between the transmitting antennas and the receiving antennas;

a Fourier transform unit that performs Fourier transform taking account of a delay for each path with the input of the propagation channel characteristics of all paths obtained in the fading setting unit, and obtains propagation channel characteristics in the frequency domain;

an operation unit that obtains spectrum information of a signal to be received in each of the receiving antennas by multiplications of the propagation channel characteristics in the frequency domain obtained by the Fourier transform unit and the operation results of the beam forming equivalence operation unit;

a time domain signal generation unit that performs inverse Fourier transform processes with the input of the operation results of the operation unit, and generates signals in the time domain to be received by the receiving antennas; and a shift addition unit that shifts and adds the signals in the time domain generated by the time domain signal generation unit by a length of the window function in the time domain, and generates consecutive signals to be received by the receiving antennas.

4. A method for testing a multi input multi output ("MIMO") scheme system adopting a multicarrier modulation scheme using K carriers in communication with one mobile terminal, performed by a processor, the method comprising:

a MIMO scheme having the number of transmitting antennas N and the number of receiving antennas M, and a beam forming process scheme for setting radiation beam characteristics based on transmitting antennas having the number of antennas N, in which N×M channels and a pseudo-propagation channel having U paths in each of the channels are assumed between the transmitting antennas and the receiving antennas, and signals received by the M receiving antennas through the propagation channel are generated to be given to a test object, the method comprising:

a step of generating R×K series of modulation signals in a frequency domain for each of the K carriers with the input of R layers' worth of data signal sequences to be transmitted to the test object;

a step of performing a convolution operation of frequency characteristics of a window function in a time domain with the input of the R×N series of modulation signals, as a process equivalent to signal excision based on multiplication of the window function in the time domain;

a step of obtaining propagation channel characteristics of all paths assumed between the transmitting antennas and the receiving antennas;

a step of performing an operation process equivalent to the beam forming process for setting the radiation beam characteristics based on the transmitting antennas having the number of antennas N to desired characteristics, with the input of the propagation channel characteristics obtained for all paths;

a step of performing Fourier transform taking account of a delay for each path with the input of the propagation channel characteristics of all paths obtained in the operation process equivalent to the beam forming process, and obtaining propagation channel characteristics in the frequency domain;

a step of obtaining spectrum information of a signal to be received in each of the receiving antennas by multiplications of the propagation channel characteristics in the frequency domain and results of the convolution operation of frequency characteristics of a window function;

a step of performing inverse Fourier transform processes with the input of the spectrum information, and generating signals in the time domain to be received by the receiving antennas; and a step of shifting and adding the generated signals in the time domain by a length of the window function in the time domain, and generating consecutive signals to be received by the receiving antennas.

5. A method for testing a multi input multi output ("MIMO") scheme system adopting a multicarrier modulation scheme using K carriers in communication with one mobile terminal, performed by a processor, the method comprising:

a MIMO scheme having the number of transmitting antennas N and the number of receiving antennas M, and a beam forming process scheme for setting radiation beam characteristics based on transmitting antennas having the number of antennas N, in which N×M channels and a pseudo-propagation channel having U paths in each of the channels are assumed between the transmitting antennas and the receiving antennas, and signals received by the M receiving antennas through the propagation channel are generated to be given to a test object, the method comprising:

a step of generating R×K series of modulation signals in a frequency domain for each of the K carriers with the input of R layers' worth of data signal sequences to be transmitted to the test object;

a step of performing a convolution operation of frequency characteristics of a window function in a time domain with the input of the R×N series of modulation signals, as a process equivalent to signal excision based on multiplication of the window function in the time domain;

a step of obtaining propagation channel characteristics of all paths assumed between the transmitting antennas and the receiving antennas;

a step of performing Fourier transform taking account of a delay for each path with the input of the propagation channel characteristics obtained for all paths, and obtaining propagation channel characteristics in the frequency domain;

a step of performing an operation process equivalent to the beam forming process for setting the radiation beam characteristics based on the transmitting antennas having the number of antennas N to desired characteristics, with the input of the propagation channel characteristics obtained by the Fourier transform;

a step of obtaining spectrum information of a signal to be received in each of the receiving antennas by multiplications of the propagation channel characteristics obtained in the operation process equivalent to the beam forming process and results of the convolution operation of frequency characteristics of the window function;

a step of performing inverse Fourier transform processes with the input of the spectrum information, and generating signals in the time domain to be received by the receiving antennas; and a step of shifting and adding the generated signals in the time domain by a length of the window function in the time domain, and generating consecutive signals to be received by the receiving antennas.

6. A method for testing a multi input multi output ("MIMO") scheme system adopting a multicarrier modulation scheme using K carriers in communication with one mobile terminal, performed by a processor, the method comprising:
- a MIMO scheme having the number of transmitting antennas N and the number of receiving antennas M, and
- a beam forming process scheme for setting radiation beam characteristics based on transmitting antennas having the number of antennas N, in which N×M channels and
- a pseudo-propagation channel having U paths in each of the channels are assumed between the transmitting antennas and the receiving antennas, and
- signals received by the M receiving antennas through the propagation channel are generated to be given to a test object, the method comprising:
- a step of generating R×K series of modulation signals in a frequency domain for each of the K carriers with the input of R layers' worth of data signal sequences to be transmitted to the test object;
- a step of performing a convolution operation of frequency characteristics of a window function in a time domain with the input of the R×N series of modulation signals, as a process equivalent to signal excision based on multiplication of the window function in the time domain;
- a step of performing an operation process equivalent to the beam forming process for setting the radiation beam characteristics based on the transmitting antennas having the number of antennas N to desired characteristics, with the input of operation results of the convolution operation of the window function;
- a step of obtaining propagation channel characteristics of all paths assumed between the transmitting antennas and the receiving antennas;
- a step of performing Fourier transform taking account of a delay for each path with the input of the propagation channel characteristics of all paths, and obtaining propagation channel characteristics in the frequency domain;
- a step of obtaining spectrum information of a signal to be received in each of the receiving antennas by multiplications of the propagation channel characteristics in the frequency domain and operation results of the operation process equivalent to the beam forming process;
- a step of performing inverse Fourier transform processes with the input of the spectrum information, and generating signals in the time domain to be received by the receiving antennas; and
- a step of shifting and adding the generated signals in the time domain by a length of the window function in the time domain, and generating consecutive signals to be received by the receiving antennas.

* * * * *